United States Patent
Chang et al.

(10) Patent No.: US 10,029,423 B2
(45) Date of Patent: Jul. 24, 2018

(54) PRINTING CORRECTION METHOD AND THREE-DIMENSIONAL PRINTING DEVICE

(71) Applicants: XYZprinting, Inc., New Taipei (TW); Kinpo Electronics, Inc., Taipei (TW); Cal-Comp Electronics & Communications Company Limited, New Taipei (TW)

(72) Inventors: Chih-Ming Chang, New Taipei (TW); Tzu-Yu Chen, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 311 days.

(21) Appl. No.: 14/985,449

(22) Filed: Dec. 31, 2015

(65) Prior Publication Data
US 2017/0050380 A1 Feb. 23, 2017

(30) Foreign Application Priority Data

Aug. 19, 2015 (CN) .......................... 2015 1 0511167

(51) Int. Cl.
| | |
|---|---|
| *B29C 67/00* | (2017.01) |
| *B29C 64/106* | (2017.01) |
| *B29C 64/386* | (2017.01) |
| *G05B 19/404* | (2006.01) |
| *B33Y 30/00* | (2015.01) |
| *B33Y 50/02* | (2015.01) |

(52) U.S. Cl.
CPC ........ *B29C 67/0088* (2013.01); *B29C 64/106* (2017.08); *B29C 64/386* (2017.08); *B33Y 30/00* (2014.12); *B33Y 50/02* (2014.12); *G05B 19/404* (2013.01); *G05B 2219/49023* (2013.01); *G05B 2219/50046* (2013.01)

(58) Field of Classification Search
CPC .............................. G05B 19/048; B33J 50/02
See application file for complete search history.

(56) References Cited

U.S. PATENT DOCUMENTS

| | | | |
|---|---|---|---|
| 6,275,032 B1 * | 8/2001 | Iwata ..................... | G01B 7/345 324/210 |
| 2007/0024293 A1 * | 2/2007 | Kosaka ................ | G01R 31/001 324/754.21 |

(Continued)

*Primary Examiner* — Mohammad Ali
*Assistant Examiner* — Vincent Chang
(74) *Attorney, Agent, or Firm* — JCIPRNET

(57) ABSTRACT

A printing correction method and a 3D printing device are provided, and the printing correction method is adapted to the 3D printing device having a printing platform. The printing correction method is as follows. An electric field is provided to the printing platform. A detection probe is extended towards a position of the printing platform along a first axial direction to enter the electric field, where the position is defined as an initial position. The detection probe is moved from the initial position along a moving path on the printing platform, and when the detection probe is moved along the moving path, an electric field variation is detected to determine a tilt variation of the printing platform relative to the first axial direction. It is determined whether to correct the printing platform according to the tilt variation of the printing platform.

12 Claims, 5 Drawing Sheets

(56) References Cited

U.S. PATENT DOCUMENTS

| | | | |
|---|---|---|---|
| 2015/0140158 A1* | 5/2015 | Cervantes | B29C 67/0085 425/461 |
| 2015/0147424 A1* | 5/2015 | Bibas | B29C 67/0088 425/150 |
| 2015/0343688 A1* | 12/2015 | Goodman | B29C 67/0088 264/39 |
| 2017/0057171 A1* | 3/2017 | Chang | B29C 67/0088 |

* cited by examiner

PRINTING CORRECTION METHOD AND THREE-DIMENSIONAL PRINTING DEVICE

CROSS-REFERENCE TO RELATED APPLICATION

This application claims the priority benefit of China patent application serial no. 201510511167.9, filed on Aug. 19, 2015. The entirety of the above-mentioned patent application is hereby incorporated by reference herein and made a part of the specification.

BACKGROUND OF THE INVENTION

Field of the Invention

The invention relates to a printing correction method and a three-dimensional (3D) printing device, and particularly relates to a printing correction method of 3D printing and a 3D printing device thereof.

Description of Related Art

Along with progress of computer-aided manufacturing (CAM), manufacturing industry has developed a three-dimensional (3D) printing technology, by which an original design conception can be quickly manufactured. The 3D printing technology is actually a general designation of a series of rapid prototyping (RP) techniques, and a basic principle thereof is additive manufacturing, where a RP machine is used to form sectional shapes of a workpiece in an X-Y plane through scanning, and intermittently shift by a layer thickness along a Z-axis, so as to form a 3D object. The 3D printing technology is not limited to any geometric shape, and the more complex the workpiece is, the more excellence the RP technology is demonstrated. The 3D printing technology can greatly save manpower and a processing time, and under a demand of the shortest time, a digital 3D model designed by software of 3D computer-aided design (CAD) can be truly presented as a physical part, which is not only touchable, a user can also actually feel a geometric curve of the physical part, and test assemblability of the physical part or even perform possible functional tests.

During a 3D printing process, a tilt situation of a printing platform used for carrying a 3D model is an important variable that influences the printing quality. The more severe the tilt situation is, the poorer the printing quality is. The conventional 3D printing device generally has a knob or a similar adjusting mechanism to facilitate a user manually adjusting the printing platform. However, the manual adjustment is inaccurate and inconvenient in usage. Therefore, it is still a goal of effort for those technicians of the field to provide a simple, accurate and efficient printing correction method and a 3D printing device thereof.

SUMMARY OF THE INVENTION

The invention is directed to a printing correction method and a three-dimensional (3D) printing device, by which tilt variations of a printing platform relative to a plurality of axial directions are obtained through a specific field, so as to determine whether to correspondingly correct the printing platform.

An embodiment of the invention provides a printing correction method, which is adapted to a 3D printing device. The 3D printing device has a printing platform. The printing correction method includes following steps. An electric field is provided to the printing platform. A detection probe is extended towards a position of the printing platform along a first axial direction to enter the electric field, where the position is defined as an initial position. The detection probe is moved from the initial position along a moving path on the printing platform. When the detection probe is moved along the moving path, an electric field variation is detected to determine a tilt variation of the printing platform relative to the first axial direction. It is determined whether to correct the printing platform according to the tilt variation of the printing platform.

Another embodiment of the invention provides a 3D printing device. The 3D printing device includes a printing platform, a detection unit, a detection probe and a control unit. The detection unit is disposed at one side the printing platform. The detection unit provides an electric field to the printing platform, and detects an electric field variation of the electric field. The detection probe is disposed at another side of the printing platform relative to the detection unit. The control unit is coupled to the printing platform, the detection unit and the detection probe. The control unit extends the detection probe towards a position of the printing platform along a first axial direction to enter the electric field, where the position is defined as an initial position. The control unit moves the detection probe from the initial position along a moving path on the printing platform, and controls the detection unit to detect the electric field variation to determine a tilt variation of the printing platform relative to the first axial direction when the detection probe is moved along the moving path. The control unit determines whether to correct the printing platform according to the tilt variation of the printing platform.

According to the above description, in the printing correction method and the 3D printing device thereof provided by the embodiments of the invention, a specific field such as the electric field is provided to the printing platform to assist obtaining a position of the detection probe relative to the printing platform. When the detection probe is moved on the printing platform along a specific moving path, a tilt situation of the printing platform is determined through a position variation of the detection probe, so as to determine whether to correct the printing platform. The aforementioned printing correction method and the 3D printing device may implement correcting the printing platform without manual operation, and detect the whole tilt situation of the printing platform in a more deep and subtle way, so as to achieve a good correction effect.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention. Moreover, in the following embodiments, the same or similar components are denoted by the same or similar referential numbers.

Figure 1:
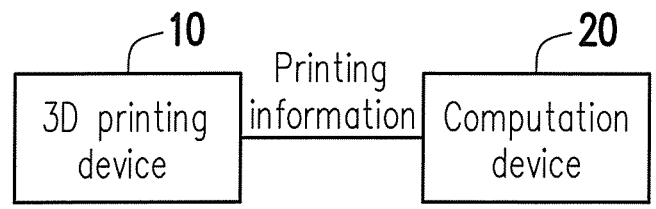
FIG. 1 is a schematic diagram of a working situation of a three-dimensional (3D) printing device.

FIG. 1 is a schematic diagram of a working situation of a three-dimensional (3D) printing device. Referring to FIG. 1, the 3D printing device 10 is adapted to printing a 3D model according to printing information provided by a computation device 20. In general, the computation device 20 is, for example, an electronic device having computation capability such as a desktop computer, a notebook computer, a smart phone or a tablet personal computer (PC), etc. In detail, the computation device 20 constructs the 3D model through computer-aided design (CAD) or animation modelling software, etc., cuts the digital 3D model into a plurality of cross-sectional layers, and provides printing information of the cross-sectional layers to the 3D printing device 10. The 3D printing device 10 may sequentially construct a plurality of layer objects according to the printing information of the cross-sectional layers, and the layer objects are stacked to form the 3D object.

Figure 2:
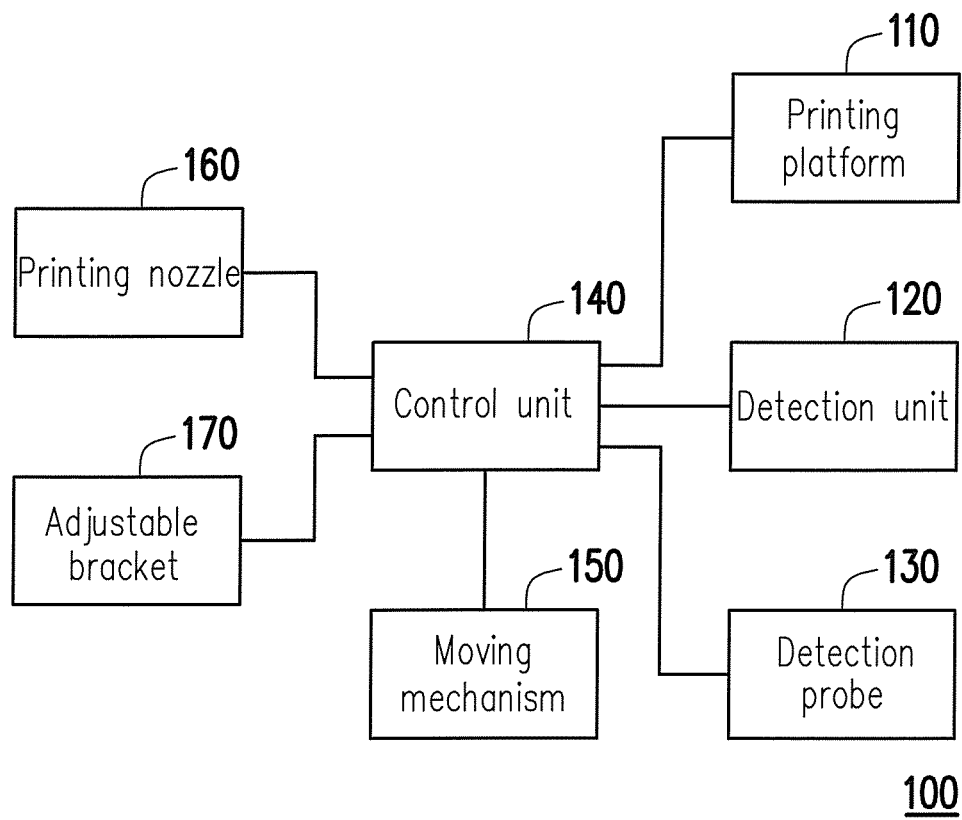
FIG. 2 is a block diagram of a 3D printing device according to an embodiment of the invention.
Figure 3:
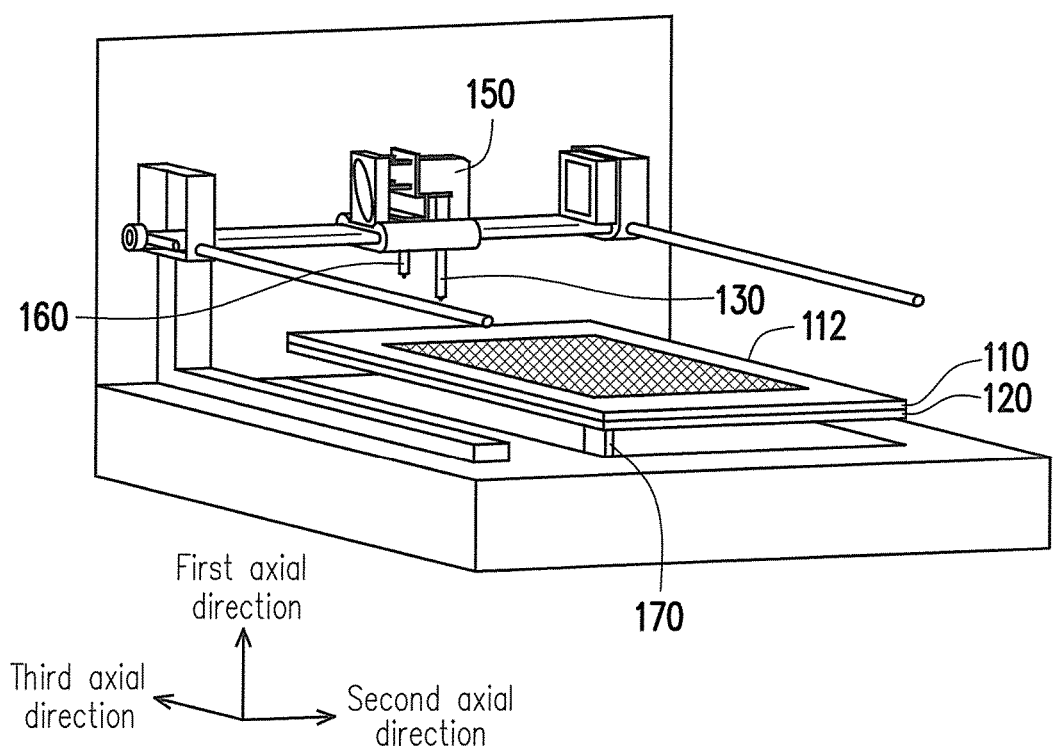
FIG. 3 is a schematic diagram of a 3D printing device according to an embodiment of the invention.

FIG. 2 is a block diagram of a 3D printing device according to an embodiment of the invention. FIG. 3 is a schematic diagram of the 3D printing device according to an embodiment of the invention. Referring to FIG. 2 and FIG. 3, the 3D printing device 100 includes a printing platform 110, a detection unit 120, a detection probe 130, a control unit 140, a moving mechanism 150 and a printing nozzle 160. The printing platform 110, the detection unit 120, the detection probe 130, the moving mechanism 150 and the printing nozzle 160 are all coupled to the control unit 140. The printing platform 110 includes a carrying surface 112, and the detection unit 120 is disposed at one side of the printing platform 110 relative to the carrying surface 112. In the present embodiment, the printing platform 110 and the detection unit 120 are, for example, integrated in one flat panel, and are supported by one or a plurality of adjustable brackets 170, though the invention is not limited thereto. A vertical adjustment and a horizontal adjustment of the adjustable brackets 170 are, for example, implemented by a step motor.

In the present embodiment, the detection unit 120 produces a quasi-static electric field on the carrying surface 112 of the printing platform 110, or even produces a quasi-static electric near field, and detects an electric field variation in real-time. In detail, the detection unit 120, for example, exerts a square wave signal with a specific frequency on a transmission electrode (not shown) to produce the electric field, and detects a variation of the electric field through a receiving electrode (not shown). It should be noted that in the present embodiment, the type and function of the detection unit 120 are not limited thereto, and in other embodiments of the invention, the detection unit 120 may also produce a magnetic field (magnetic near field) on the carrying surface 112 of the printing platform 110, and detect a magnetic field variation in real-time.

The printing nozzle 160 is disposed at another side of the printing platform 110 relative to the detection unit 120, and is coupled to the moving mechanism 150. The control unit 140 may respectively control the printing nozzle 160 and the moving mechanism 150. The moving mechanism 150, for example, includes a plurality of motors and movable long poles, though the invention is not limited thereto. The printing nozzle 160 can be a printing nozzle 160 capable of heating and melting a laminate material for spraying or a printing nozzle 160 capable of directly spraying the laminate material according to a type of the 3D printing device 100. The printing nozzle 160 may move along a first axial direction, a second axial direction and a third axial direction in the space through the moving mechanism 150, and spray the laminate material to print the 3D model.

The detection probe 130 is, for example, a columnar or square columnar probe. The detection probe 130 is also disposed at the other side of the printing platform 110 relative to the detection unit 120. In the present embodiment, the detection probe 130 is attached to the printing nozzle 160, and can also be moved on the printing platform through the moving mechanism 150. The detection probe 130 can extend or contract along the first axial direction. In another embodiment of the invention, the detection probe 130 and the printing nozzle 160 can be respectively coupled to different moving mechanisms, so as to achieve an effect of independently operate the detection probe 130 or the printing nozzle 160.

The control unit 140 is configured to receive the printing information, control the printing nozzle 160 to implement the 3D printing according to the printing information, and control the detection probe 130 to execute printing correction. The control unit 140 is, for example, a central processing unit (CPU), a programmable microprocessor, a programmable controller, application specific integrated circuits (ASIC), other similar device or a combination of the above devices.

In other embodiments of the invention, the 3D printing device 100, for example, further includes a transmission interface (not shown) and a storage unit (not shown). The transmission interface is configured to receive the printing information or the control instruction transmitted by other computation device, and is, for example, complied with a serial advanced technology attachment (SATA) standard, a universal serial bus (USB) standard, a parallel advanced technology attachment (PATA) standard or other suitable standard. The storage unit is configured to store the printing information or the control instruction transmitted by the other computation device, and is, for example, a hard disk driver (HDD) of any type, a random access memory (RAM), a flash memory or a combination of the above devices.

Figure 4:
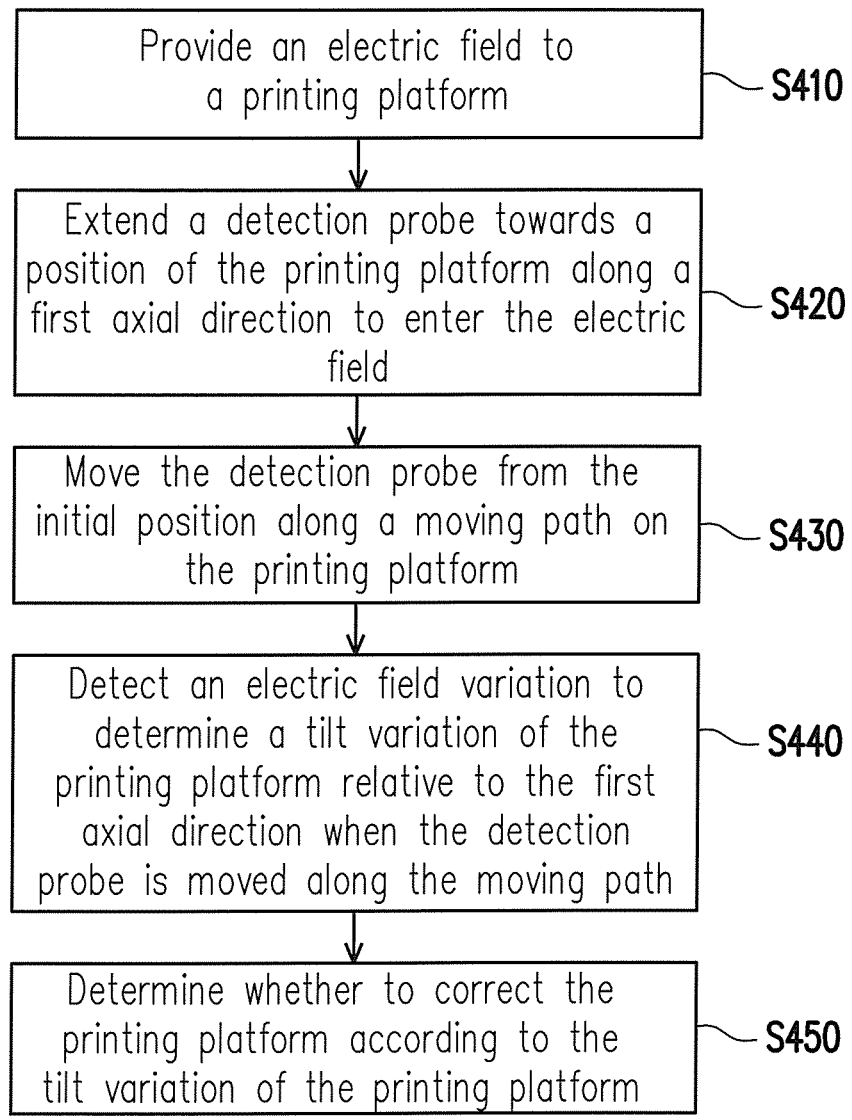
FIG. 4 is a flowchart illustrating a printing correction method according to an embodiment of the invention.

FIG. 4 is a flowchart illustrating a printing correction method according to an embodiment of the invention. The printing correction method of FIG. 4 is adapted to the 3D printing device 100 shown in FIG. 2 and FIG. 3, though the invention is not limited thereto. Referring to FIG. 2, FIG. 3 and FIG. 4, the detection unit 120 first provides an electric field on the printing platform 110 (step S410), and the control unit 140 extends the detection probe 130 towards a position of the printing platform 110 along the first axial direction to enter the electric field (step S420). It should be noted that the aforementioned position is defined as an initial position by the control unit 140, i.e. a moving start point on the printing platform 110 after the detection probe 130 enters the electric field. Besides that the detection unit 120 is used for providing the electric field, the detection unit 120 also detects an electric field variation. When the control unit 140 controls the detection probe 130 to extend along the first axial direction, once the detection probe 130 enters a range of the electric field, the electric field is twisted or deformed due to conductivity of the detection probe 130, and the detection unit 120 may detect the electric field variation. The control unit 140 determines or deduces a position of the detection probe 130 relative to the carrying surface 112 of the printing platform 110 according to the electric field variation detected by the detection unit 120. In other words, the control unit 140 may confirm that the detection probe 130 has entered the range of the electric field according to the detected electric field variation. Now, the control unit 140 may control the detection probe 130 to extend towards the printing platform 110 by a certain distance, for example, 30 mm, so as to guarantee the detection probe 130 to enter the electric field.

It should be noticed that in the present embodiment, before extending the detection probe 130 into the electric field (the step S420), the control unit 140 further moves the printing nozzle 160 and the detection probe 130 to the outside of the electric field along the first axial direction. To be specific, the control unit 140 moves the printing nozzle 160, the detection probe 130, etc., upward until the detection unit 120 cannot detect the corresponding electric field variation. In this way, the control unit 140 clears the electric field to achieve an effect similar to a "zeroing" or "initialization" effect. Then, once the detection probe 130 is extended into the electric field to cause the electric field variation, the control unit 140 may easily lock the position of the detection probe 130 relative to the printing platform 110 in the electric field according to the electric field variation detected by the detection unit 120.

On the other hand, in other embodiments of the invention, the aforementioned initial position is not the position where the detection probe 130 extends towards the printing platform 110. In detail, in the present embodiment, the 3D printing device 100 further includes an initial position sensor (not shown) disposed corresponding to the printing platform 110. After the detection probe 130 is extended into the electric field, the control unit 140 moves the detection probe 130 through the moving mechanism 150 until the initial position sensor correctly senses the detection probe 130. In other words, the initial position of the present embodiment is defined by the initial position sensor.

In an embodiment of the invention, when the control unit 140 confirms that the detection probe 130 has been extended into the electric field along the first axial direction, the control unit 140 may briefly move the detection probe 130 on the printing platform 110, and determine whether the electric field detected by the detection unit 120 has the corresponding variation, such that the control unit 140 may correctly lock the position of the detection probe 130 relative to the printing platform 110. After the control unit 140 moves the detection probe 130, if the detection unit 120 does not detect the corresponding electric field variation, the control unit 140 again moves the printing nozzle 160 and the detection probe 130 to the outside of the electric field along the first axial direction, and then extends the detection probe 130 into the electric field again.

Referring to FIG. 2, FIG. 3 and FIG. 4, when the control unit 140 confirms that the detection unit 120 may correspondingly detect the electric field variation along with the movement of the detection probe 130, the control unit 140 moves the detection probe 130 from the initial position along a moving path on the printing platform 110 (step S430). When the detection probe 130 is moved along the moving path, the control unit 140 controls the detection unit 120 to detect the electric field variation to determine a tilt variation of the printing platform 110 relative to the first axial direction (step S440).

Figure 5:
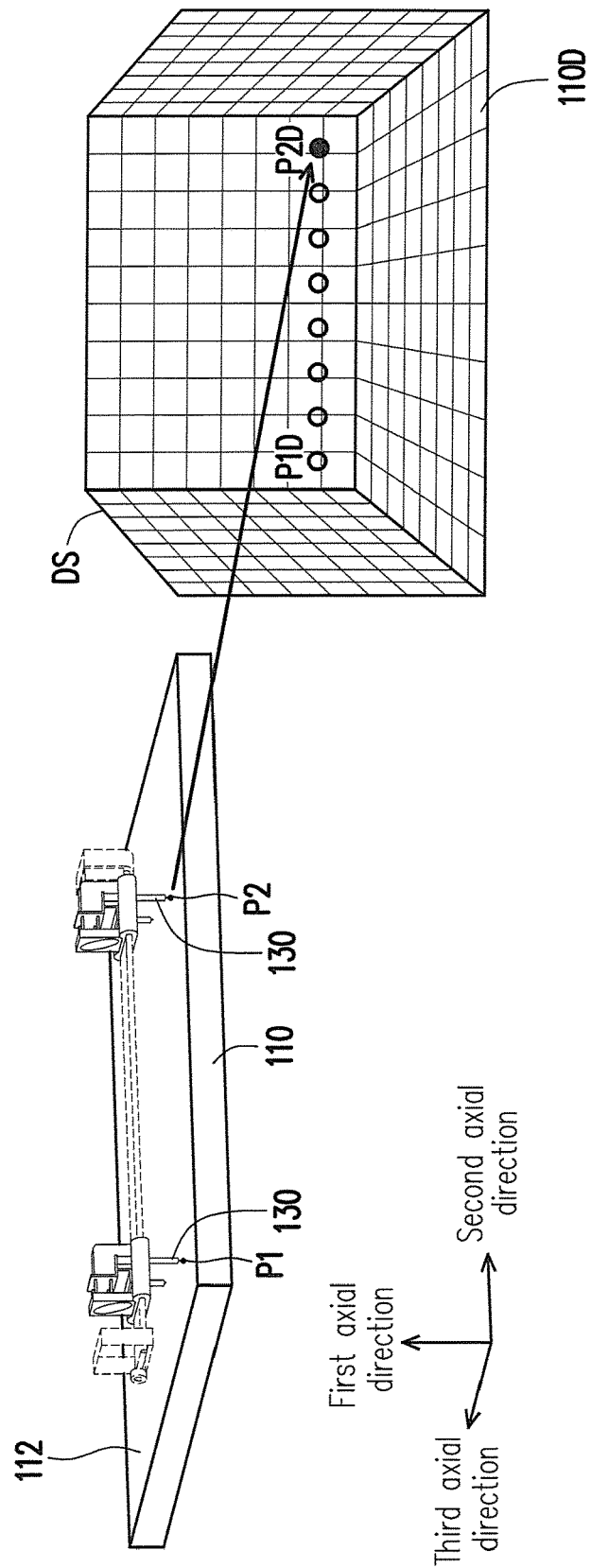
FIG. 5 is a schematic diagram of printing correction according to an embodiment of the invention.

FIG. 5 is a schematic diagram of printing correction according to an embodiment of the invention. Referring to FIG. 2 to FIG. 5, the control unit 140 first moves the detection probe 130 to an initial position P1 through the moving mechanism 150, and then moves the detection probe 130 to an end position P2 along the second axial direction while maintaining the detection probe 130 to be stationary relative to the first axial direction and the third axial direction. In other words, in the present embodiment, the moving path includes a path moving from the initial position P1 to the end position P2. When the detection probe 130 is moved along the second axial direction, the control unit 140 detects the electric field variation through the detection unit 120, and confirms or deduces the position of the detection probe 130 relative to the carrying surface 112 of the printing platform 110 according to the electric field variation. As shown in FIG. 5, within a space domain DS that can be detected by the detection unit 120, the control unit 140 may determine a position of the of the detection probe 130 relative to a space bottom 110D through the electric field variation, for example, positions P1D, P2D. The space bottom 110D is substantially complied with the carrying surface 112 of the printing platform 110, and distances between the positions P1D, P2D and the space bottom 110D are first distance values between the detection probe 130 and the printing platform 110 at the initial position P1 and the end position P2.

When the detection probe 130 is moved from the initial position P1 to the end position P2 along the second axial direction, each time when the detection probe 130 is moved by a predetermined interval, the first distance value between the printing platform 110 and the detection probe 130 is recorded. In other words, each time when the detection probe 130 is moved by the predetermined interval, the control unit 140 deduces and records a distance between the detection probe 130 and the printing platform 110 to serve as the first distance value according to the electric field variation detected by the detection unit 120. The predetermined interval is, for example, 1 centimeter (cm). Based on a variation of a plurality of the first distance values, the control unit 140 may determine the tilt variation of the printing platform 110 relative to the first axial direction. For example, if the first distance values are the same, the control unit 140 determines that the printing platform 110 is not tilted relative to the first axial direction. On the other hand, if the first distance values are different, the control unit 140 may determine the tilt variation of the printing platform 110 according to deviation values between the first distance values.

After the detection probe 130 is moved to the end position P2 along the second axial direction, the detection probe 130 is then returned to the initial position P1. Referring to FIG. 2, FIG. 3 and FIG. 4, after the tilt variation of the printing platform 110 is obtained, it is determined whether to correct the printing platform 110 according to the tilt variation of the printing platform 110 (step S450). In detail, each of the first distance values represents a distance between the detection probe 130 and the printing platform 110 at a specific position. In the present embodiment, if the first distance values are the same and have no difference, it represents that the tile variation of the printing platform 110 is zero or too small and can be ignored. Comparatively, once the first distance values have deviations therebetween, it represents that the printing platform 110 is probably tilted along the second axial direction, and now the control unit 140 starts to correct the printing platform 110.

It should be noticed that in the aforementioned embodiment, the moving path of the printing correction only includes the path from the initial position P1 to the end position P2 along the second axial direction. However, the invention is not limited thereto. In another embodiment of the invention, besides including the path from the initial position P1 to the end position P2 along the second axial direction, the moving path of the printing correction further includes a path from the initial position P1 to another end position (not shown) along the third axial direction. In detail, after the detection probe 130 is moved from the initial position P1 to the end position P2 along the second axial direction, the control unit 140 further controls the detection probe 130 to move back to the initial position P1, and then controls the detection probe 130 to move from the initial position P1 to the other end position (not show) along the third axial direction. When the detection probe 130 is moved along the third axial direction, each time when the detection probe 130 is moved by a predetermined interval, a second distance value between the printing platform 110 and the detection probe 130 is recorded according to the electric field variation. The predetermined interval is, for example, 1 cm. The method that the control unit 140 detects and records the second distance values between the printing platform 110 and the detection probe 130 is the same to the aforementioned method for detecting and recording the first distance values, and a detailed description thereof is not repeated.

Referring to FIG. 2, FIG. 3 and FIG. 4, in the present embodiment, after obtaining a plurality of the first distance values and a plurality of the second distance values, the control unit 140 determines the tilt variation of the printing platform 110 relative to the first axial direction according to the deviation values between the first distance values and the deviation values between the second distance values. To be specific, the control unit 140 may determine a horizontal level of the printing platform 110 along the second axial direction according to a plurality of the first distance values, and determine a horizontal level of the printing platform 110 along the third axial direction according to a plurality of the second distance values. Then, the control unit 140 determines whether to correct the printing platform 110 according to the aforementioned tilt variation.

In the aforementioned embodiment, the moving path of the detection probe 130 in the printing correction includes the path from the initial position P1 to the end position P2 along the second axial direction and the path from the initial position P1 to the end position (not shown) along the third axial direction. However, the invention is not limited thereto. In other embodiment, the initial position is, for example, a center of the printing platform 110, and the moving path is a round line or a spiral line while taking the initial position as a center.

Figure 6:
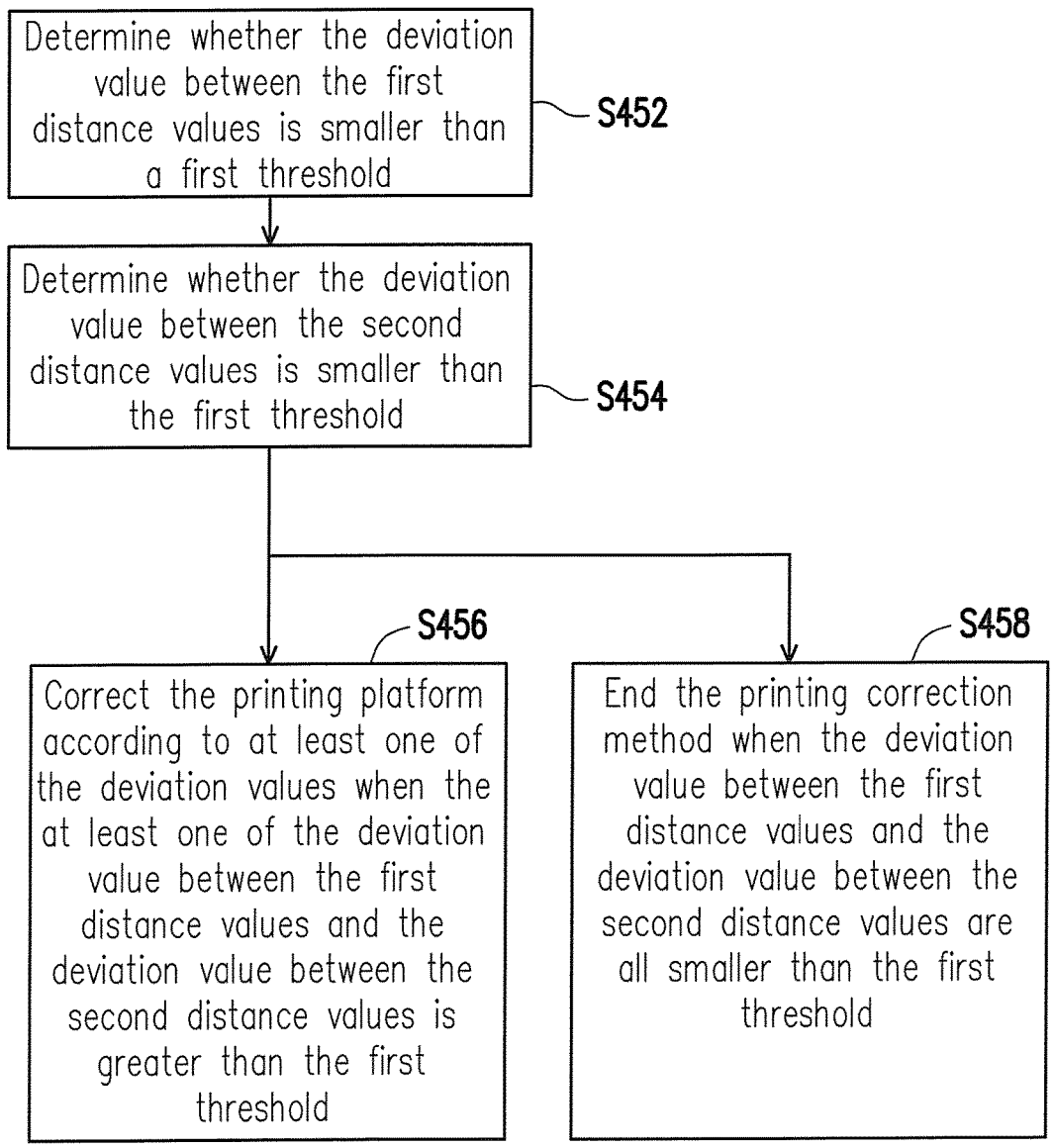
FIG. 6 is a flowchart illustrating a process for determining whether to carry on printing correction according to an embodiment of the invention.

FIG. 6 is a flowchart illustrating a process for determining whether to carry on the printing correction according to an embodiment of the invention. Referring to FIG. 2 to FIG. 4 and FIG. 6, after the control unit 140 determines the tilt variation of the printing platform 110 relative to the first axial direction, the control unit 140 further determines whether to correct the printing platform 110. In the embodiment of FIG. 6, after the control unit 140 obtains a plurality of the first distance values and the second distance values, the control unit 140 determines whether any deviation value between the first distance values is smaller than a first threshold (step S452), and determines whether any deviation value between the second distance values is smaller than the first threshold (step S454). The deviation value between the first distance values is, for example, a difference between any two of the first distance values, and the deviation value between the second distance values is, for example, a difference between any two of the second distance values. The first threshold is, for example, 0.25 mm, though the invention is not limited thereto. If the deviation values between the first distance values and the deviation values between the second distance values are all smaller than the first threshold, the printing correction method is ended (step S458).

If at least one of any deviation value between the first distance values and any deviation value between the second distance values is greater than the first threshold, the control unit 140 corrects the printing platform 110 according to the at least one of the deviation values (step S456). To be specific, if the deviation value between the first distance values is greater than the first threshold, the control unit 140 automatically corrects the printing platform 110 along the second axial direction, so as to make the printing platform 110 to present a horizontal state. The control unit 140, for example, controls the adjustable brackets 170 to correct the printing platform 110, though the invention is not limited thereto. Similarly, if the deviation value between the second distance values is greater than the first threshold, the control unit 140 automatically corrects the printing platform 110 along the third axial direction, so as to make the printing platform 110 to present the horizontal state.

In an embodiment of the invention, after the printing platform 110 is corrected, the control unit 140 re-obtains the first distance values and the second distance values between the printing platform 110 and the detection probe 130, and determines whether any deviation value between the first distance values and any deviation value between the second distance values are smaller than the first threshold. Now, if the deviation value between the first distance values and the deviation value between the second distance values are smaller than the first threshold, it represents that the printing platform 110 has been corrected to the horizontal state without tilting. Conversely, if one of any deviation value between the first distance values and any deviation value between the second distance values is still greater than the first threshold value, it represents that the correction is failed. Now, the 3D printing device 100 correspondingly displays a warning message or produces a warning sound.

It should be noted that in another embodiment of the invention, the steps and functions executed by the control unit 140 of the 3D printing device 100 in the aforementioned printing correction method can be implemented by other computation device coupled to the 3D printing device 100. In other words, the other computation device can be used to control and execute the printing correction. In this way, the control unit 140 of the 3D printing device 100 is avoided to execute too many programs and perform too many computations.

In summary, in the printing correction method and the 3D printing device thereof provided by the embodiments of the invention, a specific field such as the electric field is provided on the printing platform to assist obtaining a position of the detection probe relative to the printing platform. When the detection probe is moved on the printing platform along a specific moving path, a distance variation between the detection probe and the printing platform is deduced according to a position variation of the detection probe, so as to determine a tilt situation of the printing platform to determine whether to correct the printing platform. The aforementioned printing correction method and the 3D printing device may implement correcting the printing platform without manual operation, and detect the whole tilt situation of the printing platform in a more deep and subtle way, so as to achieve a good correction effect.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A printing correction method, adapted to a three-dimensional (3D) printing device, the 3D printing device having a printing platform, and the printing correction method comprising:
   a detection unit, disposed at one side of the printing platform, providing an electric field to the printing platform;
   extending a detection probe towards a position of the printing platform along a first axial direction to enter the electric field, wherein the position of the printing platform is defined as an initial position, wherein the electric field is twisted or deformed due to a conductivity of the detection probe;
   moving the detection probe from the initial position along a moving path on the printing platform;
   moving the detection probe from the initial position along a second axial direction on the printing platform;
   moving the detection probe from the initial position along a third axial direction on the printing platform;
   detecting an electric field variation to determine a tilt variation of the printing platform relative to the first axial direction when the detection probe is moved along the moving path; and
   determining whether to correct the printing platform according to the tilt variation of the printing platform, wherein when the detection probe is moved along the second axial direction, a first distance value between the printing platform and the detection probe is recorded each time when the detection probe is moved by a predetermined interval, and when the detection probe is moved along the third axial direction, a second distance value between the printing platform and the detection probe is recorded each time when the detection probe is moved by the predetermined interval.

2. The printing correction method as claimed in claim 1, wherein
   the step of detecting the electric field variation to determine the tilt variation when the detection probe is moved further comprises:
   recording a plurality of first distance values between the printing platform and the detection probe according to the electric field variation; and
   determining the tilt variation of the printing platform relative to the first axial direction according to a deviation value between the first distance values.

3. The printing correction method as claimed in claim 1, wherein
   the step of detecting the electric field variation to determine the tilt variation when the detection probe is moved further comprises:
   recording a plurality of first distance values and a plurality of second distance values between the printing platform and the detection probe according to the electric field variation; and
   determining the tilt variation of the printing platform relative to the first axial direction according to a deviation value between the first distance values and the deviation value between the second distance values.

4. The printing correction method as claimed in claim 3, wherein the step of determining whether to correct the printing platform according to the tilt variation further comprises:
   determining whether the deviation value between the first distance values is smaller than a first threshold;
   determining whether the deviation value between the second distance values is smaller than the first threshold; and
   correcting the printing platform according to at least one of the deviation values when the at least one of the deviation value between the first distance values and the deviation value between the second distance values is greater than the first threshold.

5. The printing correction method as claimed in claim 4, wherein after the printing platform is corrected, the printing correction method further comprises:
   re-obtaining the first distance values and the second distance values between the printing platform and the detection probe; and
   determining whether the deviation value between the first distance values and the deviation value between the second distance values are smaller than the first threshold.

6. The printing correction method as claimed in claim 1, wherein the 3D printing device further comprises a printing nozzle and a moving mechanism, the printing nozzle is moved along the first axial direction and the moving path through the moving mechanism, and the detection probe is attached to the printing nozzle,
   before the detection probe is extended into the electric field, the printing correction method further comprises:
   moving the printing nozzle and the detection probe to the outside of the electric field along the first axial direction.

7. A 3D printing device, comprising:
   a printing platform;
   a detection unit, disposed at one side of the printing platform, providing an electric field to the printing platform, and detecting an electric field variation of the electric field;
   a detection probe, disposed at another side of the printing platform relative to the detection unit; and
   a control unit, coupled to the printing platform, the detection unit and the detection probe, wherein the control unit extends the detection probe towards a position of the printing platform along a first axial direction to enter the electric field, and the position of the printing platform is defined as an initial position, wherein the electric field is twisted or deformed due to a conductivity of the detection probe;
   the control unit moves the detection probe from the initial position along a moving path on the printing platform, and controls the detection unit to detect the electric field variation to determine a tilt variation of the printing platform relative to the first axial direction when the detection probe is moved along the moving path; and the control unit determines whether to correct the printing platform according to the tilt variation of the printing platform, wherein the control unit moves the detection probe from the initial position along a second axial direction, and moves the detection probe from the initial position along a third axial direction on the printing platform, wherein when the detection probe is moved along the second axial direction, the control unit records a first distance value between the printing platform and the detection probe each time when the detection probe is moved by a predetermined interval, and when the detection probe is moved along the third axial direction, the control unit records a second distance value between the printing platform and the detection probe each time when the detection probe is moved by the predetermined interval.

8. The 3D printing device as claimed in claim 7, wherein the control unit records a plurality of first distance values between the printing platform and the detection probe according to the electric field variation, and determines the tilt variation of the printing platform relative to the first axial direction according to a deviation value between the first distance values.

9. The 3D printing device as claimed in claim 7, wherein the control unit records a plurality of first distance values and a plurality of second distance values between the printing platform and the detection probe according to the electric field variation; and the control unit determines the tilt variation of the printing platform relative to the first axial direction according to a deviation value between the first distance values and the deviation value between the second distance values.

10. The 3D printing device as claimed in claim 9, wherein the control unit determines whether the deviation value between the first distance values is smaller than a first threshold, and determines whether the deviation value between the second distance values is smaller than the first threshold; and the control unit corrects the printing platform according to at least one of the deviation values when the at least one of the deviation value between the first distance values and the deviation value between the second distance values is greater than the first threshold.

11. The 3D printing device as claimed in claim 10, wherein after correcting the printing platform, the control unit re-obtains the first distance values and the second distance values between the printing platform and the detection probe, and determines whether the deviation value between the first distance values and the deviation value between the second distance values are smaller than the first threshold.

12. The 3D printing device as claimed in claim 7, further comprising:
   a moving mechanism, coupled to the control unit; and
   a printing nozzle, coupled to the control unit and the moving mechanism, and moving along the first axial direction and the moving path through the moving mechanism, and the detection probe being attached to the printing nozzle,
   wherein before the control unit extends the detection probe into the electric field, the control unit further moves the printing nozzle and the detection probe to the outside of the electric field along the first axial direction.

* * * * *